2,545,041

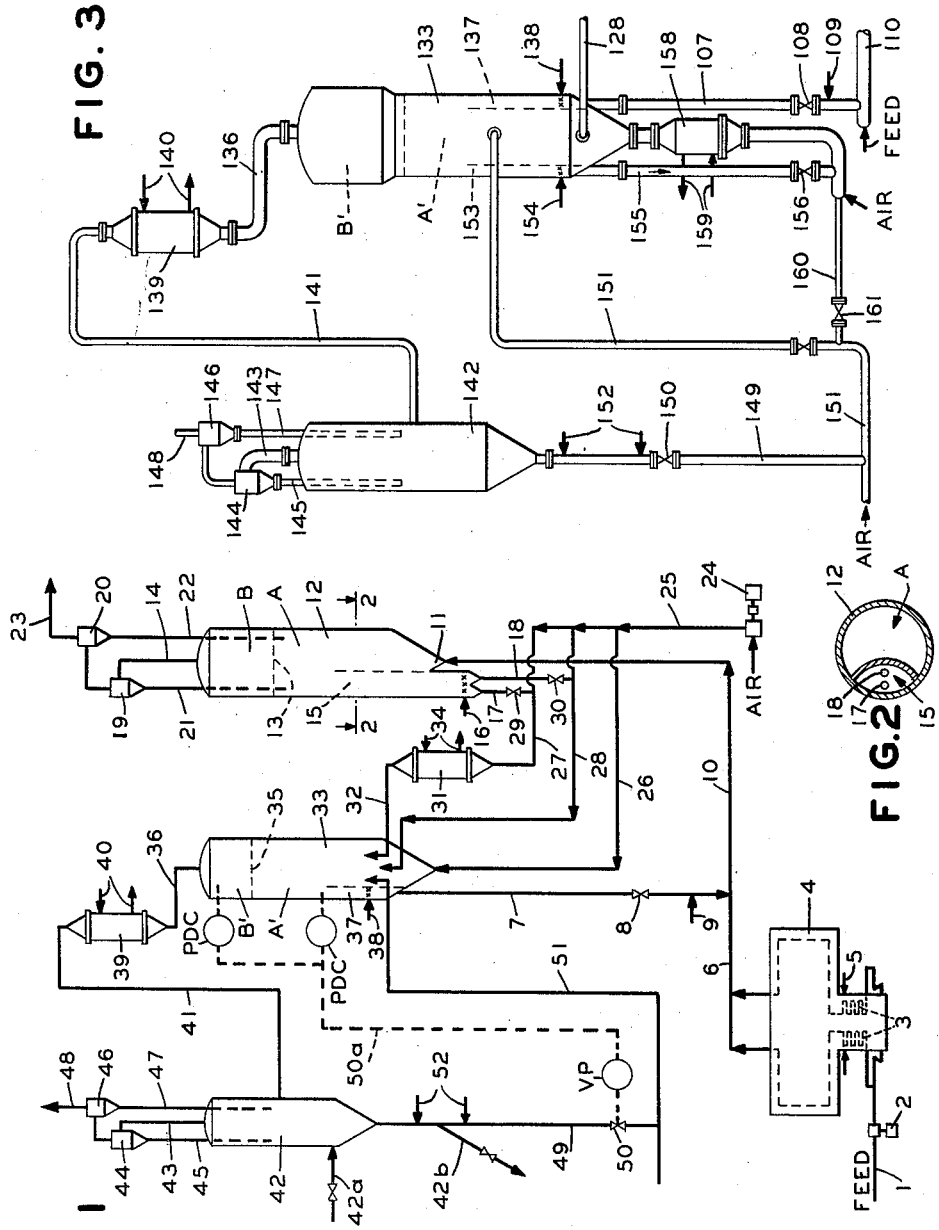
March 13, 1951 — J. W. MOORMAN ET AL — 2,545,041
TEMPERATURE CONTROL IN REGENERATION OF CONTACT AGENTS
Filed May 26, 1949
*INVENTORS*
JOSEPH W. MOORMAN
LOUIS J. KELLY
BY E. F. Liebrecht
Edmond F. Shanahan
ATTORNEYS Patented Mar. 13, 1951

UNITED STATES PATENT OFFICE 2,545,041

TEMPERATURE CONTROL IN REGENERATION OF CONTACT AGENTS

Joseph W. Moorman, Alpine, and Louis J. Kelly, Tenafly, N. J., assignors to The M. W. Kellogg Company, Jersey City, N. J., a corporation of Delaware Application May 26, 1949, Serial No. 95,548

5 Claims. (Cl. 196—52)

The present invention relates in general to improvements in the regeneration of powdered catalytic materials which have become spent in use by reason of a deposit of combustible material thereon, particularly as applied to the catalytic conversion of hydrocarbons by a continuous cyclic process wherein said particles of a catalytic material and vapors of the hydrocarbons undergoing conversion are contacted in a conversion zone, spent catalyst particles are separated from the vaporous conversion products and thereafter regenerated for reuse by contacting them with an oxygen-containing gas under suitable conditions to cause combustion of the carbonaceous deposit thereon. The contacting occurs in a regeneration zone in which the catalyst particles are maintained in a fluidized state and an interface is maintained between a lower dense phase and an upper light phase by the upward passage of the regenerating gas through the regenerating zone. More particularly, this invention discloses a method for controlling the temperature of the dense phase mass of catalyst in the regeneration zone; the cooling is accomplished by maintaining the interface level at a predetermined elevation such that the withdrawn overhead phase contains the amount of catalyst required for cooling the dense phase to the desired temperature.

This application is a continuation-in-part of our copending application Serial No. 775,050, filed September 19, 1947.

Heretofore, various processes have been proposed for effecting regeneration operations of this type. Because of the highly exothermic character of the combustion reaction involved, and the sensitivity of the catalytic materials at high temperatures, the provision of a satisfactory regeneration process has been attended with many difficulties. Furthermore, conversion reactions of this type are necessarily practiced commercially in units of considerable size and capacity and, accordingly, the problem of minimizing the size and cost of the necessary equipment is of outstanding importance.

The primary object of the present invention is the provision of a regeneration process wherein the temperature of the regeneration operation and the rate of combustion may be readily and satisfactorily maintained within desired limits, and one which may be practiced in apparatus substantially reduced in size and consequent cost of construction compared to the apparatus required in procedures heretofore proposed.

Prior to the present invention, it has been proposed to effect the regeneration of spent powdered or finely divided cracking catalyst, and similar materials, by a procedure involving the suspension of the catalyst particles in an oxygen-containing gas and the passage of the suspension through a regeneration zone under conditions adapted to cause combustion of the deactivating deposit of carbonaceous material. It has been further proposed, in connection with this method, to control the temperature of the regeneration zone by recycling thereto a portion of the regenerated catalyst after cooling this portion to a suitable temperature in a cooling zone extraneous of the regeneration zone. The quantity of cooled recycled catalyst necessary in this instance is depended upon its temperature, and decreases with decrease in temperature of the cooled recycled catalyst stream. In the previously proposed method, however, the cooling catalyst stream has been withdrawn from the dense phase mass of catalyst within the regeneration zone, cooled to the desired cooling temperature, and recycled to the regeneration zone; the gaseous reaction products have ordinarily been withdrawn from the top of the regeneration chamber after separation by settling or cyclone separators of all the catalyst possible. In accordance with this mode of operation, the interface between the lower dense phase and the upper dilute phase is usually maintained at a level 15 feet or more below the point of withdrawal of the regeneration gases. The reason for this is that about 15 feet seems to be the minimum suitable settling space for the de-entrainment of catalyst of the customary particle size from gases moving at the velocity which is ordinarily employed in fluidized catalyst systems. The velocities are usually between 1.0 and 1.7 feet per minute. Frequently, cyclone separators constructed to withstand high temperatures are suspended within the dilute phase settling region of the regeneration zone.

It has also been proposed to remove the relatively small amount of catalyst remaining in the withdrawn regeneration gases by first cooling them to a temperature of about 650° F. or lower and then passing them through Cottrell separators, the preliminary cooling being required because the separators are not designed to withstand higher temperatures.

In contrast with these previously proposed methods of separating catalysts and of cooling the regeneration zone, the present invention proposes to maintain the interface at a height which results in sufficient carry over of the catalyst with the withdrawn regeneration gases to cool the dense phase in the regeneration zone. Of course, there is a minimum height of dense phase below which the interface must not fall if adequate regeneration is to be accomplished; but above this minimum height there is a range in which any level of operation is quite satisfactory except that higher levels will result in more catalyst carryover because of the reduction of settling space as the interface approaches the point of withdrawal of regeneration gases. Within this satisfactory operating range the amount of catalyst carryover can be increased or diminished as desired by raising or lowering the interface level. The interface levels required in a particular case will depend in part upon such predetermined factors as gas velocities, particle sizes, apparatus dimensions, and, in part, on the behavior of a particular piece of apparatus as determined from operating tests. The present method is not concerned with the details or precise conditions which may be required to effect a given level in a specific case but with a method of operation which may be applied to a specific case by those skilled in the art.

Moreover, it should be noted that the "interface" referred to is not as sharply defined as the surface of a body of water or the like, but is really a horizontal region having perceptible thickness—a region in which the density of catalyst decreases with elevation at a rate which is much greater than in the regions above and below it. In short, the interface is a discontinuity region of sudden density change between a lower dense phase and an upper dilute phase. However, in spite of the fact that the interface is not exactly like that between a liquid and a gas, it is readily determinable and is one of the properties of fluidized catalyst systems which distinguishes them from other solid-vapor contact systems.

When the present method of regenerator cooling is employed all of the withdrawn dilute phase is cooled to a predetermined temperature and is transferred to a cooled catalyst hopper in which the catalyst is separated and accumulated. If desired, some catalyst may be separated from the dilute phase before its passage through the cooler, provided that the catalyst remaining in suspension is sufficient to accomplish the subsequent cooling required. Furthermore, the discharge temperature of the cooler may be sufficiently low to permit the use of separating means not capable of operating at high temperatures, Cottrell precipitators, for example.

Cooled catalyst is continuously withdrawn from the cooled catalyst hopper and entrained in the regenerating gas being introduced upwardly into the bottom of the regeneration zone. The temperature at which the regeneration zone is to operate can be established by adjustment of the recirculating catalyst valve. Increasing the flow of cooled catalyst from the cooled catalyst hopper through this valve causes the interface within the regeneration zone to rise and the amount of carryover catalyst to increase. Reducing the flow of cooled catalyst through the recirculating catalyst valve results in the fall of cooled catalyst and a consequent reduction in carryover catalyst and in dense phase temperature. After the system has been placed in operation at a given temperature, this temperature can be maintained by continuously adjusting the recirculating catalyst valve to maintain the interface level which corresponds to a particular temperature. If desired, this may be accomplished automatically by instrumentation for controlling the valve so as to maintain a predetermined interface level within the regeneration zone in accordance with methods and apparatus for bed level maintenance well known to those familiar with the fluidized catalyst art.

Various other specific features and objects and advantages of our invention will be apparent from the detailed description given in connection with the drawing and the five tables. The drawing discloses the type of apparatus in which the method of the present invention may be practiced. The tables describe the conditions of operation. Particularly, Table V relates to a mode of operation in which the only cooler in the system is that which is employed for cooling the dilute phase withdrawn from the regeneration zone. Tables I to IV and methods of operation described in connection therewith relate to modifications in which the method of the present invention is of less importance and is used with other cooling means.

In the drawings:

Figure 1 is a diagrammatic illustration of a suitable arrangement of apparatus and process flow for the practice of the invention as applied to the catalytic conversion of high boiling hydrocarbons to low boiling hydrocarbons within the motor fuel boiling range.

Figure 2 is a sectional view taken along line II—II of Figure 1.

Figure 3 is a diagrammatic illustration of a modified form of apparatus for the practice of the embodiment of the invention involving the cooling of a recycled stream of regenerated catalyst.

Following the process flow illustrated in Fig. 1 of the drawings, a suitable feed stock, for example, a high boiling hydrocarbon fraction such as a reduced petroleum crude, gas oil, or the like, is introduced through line 1 by pump 2 into heating coils 3 in furnace 4, wherein it is vaporized and heated to a temperature approximately that required for the subsequent conversion operation. In the case of a reduced crude charging stock, a portion of the feed as discharged from the furnace will remain unvaporized. Steam may be suitably introduced into the furnace coil at intermediate points through lines 5 to facilitate vaporization, and sufficient pressure is maintained at the furnace outlet to prevent coking of the coil. From furnace 4, the heated charge passes by transfer line 6 to the base of a regenerated catalyst standpipe 7 or other suitable source of active catalytic material. From standpipe 7, hot active catalyst is introduced at a rate controlled by valve 8 into the feed mixture, the heat content of the regenerated catalyst stream being sufficient to completely vaporize the oil, not vaporized in the furnace, provide the heat of cracking by superheating the vapors, and to discharge the products from the reactor at the desired end conversion temperature, for example about 950° F. In the case of a reduced crude charging stock, the vaporization of the oil at this point includes a partial decomposition or cracking of this non-volatile component of the feed. Additional steam may suitably be introduced through line 9 to form a gaseous suspension with the catalyst discharged through valve 8. The mixture of catalyst particles and vapors passes through line 10 and inlet 11 into the lower part of reactor 12. Reactor 12 is a vessel in the form of a cylinder or other suitable shape having a relatively great cross-sectional area compared to the cross-sectional area of the vapor inlet line 10, and these relative proportions cause a corresponding reduction in the velocity of the vapors after their passage from inlet line 10 into reactor 12. The velocity of the vapors in reactor 12 preferably is maintained within such limits as to produce therein a highly turbulent and concentrated or dense phase of the catalyst, similar to the condition maintained in zone A' of the regenerator. However, any conditions adapted to produce suitable contact between the catalyst particles and the vapors undergoing conversion may be utilized in the conversion zone with reference to the practice of the present invention.

The dense turbulent catalyst phase (zone A) extends only partially up the reactor, the upper horizontal level thereof being indicated by dotted line 13. Zone B, the reactor space above this level 13, constitutes a catalyst-vapor disengaging space, a relatively small proportion of the total catalyst introduced being carried out overhead with the vaporous conversion products from zone B through vapor outlet 14. Used or spent catalyst suitably is withdrawn from the conversion zone by a catalyst withdrawal passageway 15 opening directly into the dense catalyst phase in zone A. The relatively cross-sectional areas of catalyst outlet 15 and reactor 12 are shown in Fig. 2. A suitable inert gas such as steam is introduced in the lower portion of the catalyst withdrawal passageway 15 through line 16 to displace or strip hydrocarbon vapors mixed or entrained with the separated catalyst and to maintain the catalyst therein in an aerated flowable condition. Catalyst is withdrawn from passageway 15 in two streams through catalyst standpipes 17 and 18 to which an inert aerating medium is supplied by means of suitable inlet lines (not illustrated) distributed at suitable intervals along their length to maintain the catalyst flowing therethrough in a dense but readily flowable state.

The vaporous conversion products containing a relatively small proportion of the total catalyst fed to the reactor, that is, an amount of the order of about 15 per cent or less, pass overhead from zone B through outlet 14 to a suitable gas-solid separating system. This separating system may consist of any one of various available means for separating the suspended catalyst, and returning it to the system. The catalyst thus recovered may be returned directly to the reactor, or optionally to the stripping zone in catalyst outlet 15. As shown, this system comprises a plurality of cyclone separators 19 and 20 arranged in series, in each of which a portion of the catalyst is separated from the vapors and withdrawn through the lower hopper, the separated vapors being withdrawn overhead and passed to the subsequent separating stage. The catalyst is withdrawn from the hoppers through tailpipes 21 and 22, which preferably extend as indicated into the reactor a short distance below the upper level 13 of the dense catalyst phase. Tailpipes 21 and 22 likewise may be suitably provided with inlet lines, not shown, distributed at suitable intervals along their length for introducing an aerating medium thereto to maintain the catalyst passing therethrough in a flowable condition. The vaporous conversion products withdrawn from the final cyclone 20 through outlet line 23 are passed to a suitable products recovery system, such as a fractionating tower or the like, wherein the products are separated into the desired fractions, such as gasoline, fuel oil, and cycle oil. The small amount of catalyst remaining in the vapors withdrawn through line 23 may be recovered by partially condensing these vapors, thereby concentrating this residual catalyst in the heavy boiling condensate which may be recycled to the reactor through feed line 1, as described in the patent to Belchetz, No. 2,374,073, granted April 17, 1945.

In appended Table 1 there is given an illustrative example of suitable dimensions for reactor 12 and of operating conditions for the conversion of a reduced crude petroleum oil over a powdered alumina-silica type of cracking catalyst of the activated clay "Super-Filtrol" variety, into low boiling constituents consisting of a large proportion of low boiling hydrocarbons within the gasoline boiling range and characterized by their high octane value. In this particular case the reactor was designed to process 16,000 bbl./day of a Mid-Continent reduced crude having a gravity of 23 degrees A. P. I. to produce the following products in the yields indicated:

| | |
|---|---|
| 10# R. V. P. gasoline _____vol. percent__ | 42.5 |
| No. 3 heating oil _____do____ | 11.2 |
| Heavy gas oil _____do____ | 32.8 |
| No. 5 fuel oil _____do____ | 7.2 |
| Excess butane _____do____ | 5.5 |
| Dry gas _____weight percent__ | 6.5 |
| Coke _____do____ | 4.2 |

*Table I*

| | |
|---|---|
| Reduced crude oil feed_____bbl./day__ | 16,000 |
| Steam feed (based on oil feed) _____ wt. percent__ | 10 |
| Reactor dimensions: | |
|   Zone A— | |
|     Height _____ft__ | 18 |
|     Diameter _____ft__ | 19.5 |
|     Height _____ft__ | 8 |
|   Zone B— | |
|     Diameter _____ft__ | 19.5 |
| Feed wt. ratio of catalyst to oil_____ | 7.5:1 |
| Oil-vapor temp. (at furnace outlet) _____°F__ | 900 |
| Regenerated catalyst temp. (standpipe 7)_____°F__ | 1050 |
| Catalyst concentration (average)— | |
|   (a) Zone A_____lbs./cu. ft__ | 15.7 |
|   (b) Zone B_____lbs./cu. ft__ | 1.0 to 1.5 |
|   (c) Catalyst draw-off line 15_____lbs./cu. ft__ | 18.5 |
|   (d) Vapor line 23___grains/cu. ft__ | 6 |
| Vapor velocities— | |
|   Zone A_____ft./sec__ | 1.5 |
|   Zone B_____ft./sec__ | 2.06 |
| Oil contact time (average)___seconds__ | 10 |
| Catalyst contact time (average)__do____ | 156 |
| Ratio of wt. of oil fed/hr. to wt. of catalyst in zone A_____ | 3.09 |
| Reaction vapor temp. at outlet from zone B_____°F__ | 945 |
| Reactor pressures (gauge)— | |
|   (a) Inlet to zone A____lbs./sq. in__ | 10.0 |
|   (b) Outlet from zone B_____lbs./sq. in__ | 8.0 |

Referring now to the regeneration stage of the cyclic operation, the spent catalyst is preferably passed to the regenerator in two separate streams withdrawn through catalyst standpipes 17 and 18, one of these streams, the former, being cooled while the other is passed to the regenerator without cooling. A suitable oxygen-containing gas such as air is supplied to the regenerator by any suitable means such as air compressor 24 through manifold line 25. The air necessary for regeneration may be supplied to the regenerator in several streams, the main quantity of air being supplied through line 26 leading to the base of the regenerator. The remaining air may be supplied through line 27 and 28, to which lines spent catalyst is introduced by catalyst standpipes 17 and 18, respectively, at suitable rates regulated by valves 29 and 30. In place of an oxygen-containing gas, an inert fluid conveying medium such as steam, flue gas or the like, may be supplied to lines 27 and 28. The gaseous suspension of spent catalyst in line 27 is carried through a suitable cooler or heat exchanger 31 wherein it is cooled to a relatively low temperature, preferably below the ignition temperature of the carbonaceous deposit, and then passes therefrom through outlet line 32 into the base of the regenerator 33. A suitable cooling medium is circulated to exchanger 31 through line 34. The gaseous suspension of catalyst in line 28 is passed directly to the lower portion of the regenerator 33, without cooling. Alternatively, all of the spent catalyst may be passed by line 27 through exchanger 31 and the total stream cooled to a somewhat higher temperature corresponding to that resulting from mixing the streams in lines 32 and 28. The use of two lines as shown is greatly preferred, however, since the flexibility of control is greatly enhanced by diverting a suitable amount from one stream to the other as required.

The quantity of regenerating fluid introduced into the regenerator is maintained within such limits that the upward velocity of the gases through the regenerator produces a highly concentrated and turbulent dense phase of the catalyst. The upper level for this dense phase zone A' is indicated by dotted line 35 and the physical characteristics of this phase are similar to those of dense phase zone A present in the reactor 12.

Zone B', the space in the regenerator above level 35, similar to zone B above level 13 of the reactor, constitutes a catalyst-vapor disengaging space, this zone preferably extending a sufficient distance down from the entrance to outlet 36 so that only a relatively small portion of the total catalyst introduced is carried out overhead with the flue gas from zone B' through outlet line 36.

Regenerated catalyst is suitably withdrawn from the regeneration zone by a catalyst withdrawal passageway 37 opening directly into zone A', the dense catalyst phase. A stripping medium, such as steam, may be supplied to passageway 37 by line 38 in amount sufficient to strip the withdrawn regenerated catalyst from entrained oxygen-containing gas, or any suitable aerating medium may be used to maintain the body of catalyst therein in a dense but readily flowable condition. From passageway or compartment 37 regenerated catalyst is forwarded by catalyst standpipe 7 to the conversion stage as previously described.

Catalyst contained in the flue gas suspension withdrawn overhead through line 36 may be recovered in any suitable arrangement of gas-solid separators, such as cyclones, Cottrell precipitators or the like, and the recovered catalyst returned with or without substantial cooling of this stream to the regenerator or any convenient point in the system, such as reactor 12.

In illustrating suitable operating conditions maintained in the regeneration stage pursuant to the present invention, appended Table II consists of a tabulation of regeneration stage conditions corresponding to an operation in the conversion stage as given in Table I.

Table II is on the basis of no temperature control duty being performed by the catalyst withdrawn overhead through line 36, as for example, when this catalyst is returned at substantially the same temperature as withdrawn, or is forwarded to some part of the system other than the regeneration zone, or is negligible in amount. Table IV, given hereinafter, illustrates the application of the invention when the stream of catalyst withdrawn overhead and recycled to the regenerator is utilized to effect a substantial degree of temperature control duty.

*Table II*

Regenerator dimensions:
    Zone A'—
        Height _____ ft__ 7
        Diameter _____ ft__ 3.05
    Zone B'—
        Height _____ ft__ 16
        Diameter _____ ft__ 30.5
Spent catalyst (lines 17 and
    18) _____ lbs./hr__ 1,617,355
Cooled spent catalyst (line
    32) _____ lbs./hr__ 1,294,420
Spent catalyst (line 28) _____ lbs./hr__ 322,935
Temp. of cooled spent catalyst (line
    32) _____ °F__ 785 to 740
Temp. of spent catalyst (line
    28) _____ °F__ 940 to 985
Temp. of regeneration zone _____ °F__ 1050
Catalyst concentration (average)—
    (a) Zone A' _____ lbs./cu.ft__ 14.8
    (b) Zone B' _____ lbs./cu.ft__ 1.0 to 1.5
    (c) Catalyst draw-off line
        37 _____ lbs./cu.ft__ 18.0
    (d) Flue gas outlet line
        36 _____ grains/cu.ft__ 400
Gas velocities—
    Zone A' _____ ft./sec__ 1.62
    Zone B' _____ ft./sec__ 1.85
Catalyst contact time (average) __seconds__ 120
Regenerator pressures (gauge)—
    (a) Inlet to zone A' _____ lbs./sq.in__ 5.4
    (b) Outlet from zone B' ____ lbs./sq.in__ 3.9

As indicated in Table II, the temperature of the catalyst in lines 32 and 28 may vary, dependent upon the extent of the preliminary combustion which occurs when air is employed as the conveying medium through these lines.

The regeneration gases together with particles of catalyst not disengaged in the zone B' may be directed from the top of the regenerator 33 either through a recovery system, as provided for reactor 12, or through line 36 to a cooler 39, wherein they pass in indirect heat exchange with a cooling fluid medium circulated by means of lines 40. In connection with the method of the present invention, it should be noted that the dilute phase passing through cooler 39 emerges from its outlet at a predetermined cooled catalyst temperature which is substantially constant regardless of variations in the amount of catalyst passing through cooler 39. The cooled catalyst temperature is substantially constant for the system and cooling of the dense phase in the regeneration zone is increased or reduced by increasing or reducing the quantity of recirculated cooled catalyst. The outlet temperature for the dilute phase emerging from cooler 39 may be as low as 650° F. or less in order that Cottrell precipitators, or low temperature cyclone separators, or the like may be employed for separating catalyst.

The mixture of regeneration gases and entrained solids is directed from the cooler through line 41 to a separator comprising cooled catalyst hopper 42 and cyclone separators connected in series, such as 44 and 46, in each of which a portion of the catalyst is separated from the vapors and returned to the hopper 42. The mixture from line 41 enters the side of hopper 42 and is directed out of the hopper through overhead line 43 to the cyclones. Separated catalyst particles from each of the series connected cyclones 44 and 46 are returned to the hopper 42 through tailpipes 45 and 47, respectively, and overhead line 48 conducts the separator vapors to a stack. Cooled regenerated catalyst is withdrawn from the bottom of cooled catalyst hopper 42 through standpipe 49 controlled by a cooled catalyst valve 50, and is conveyed back to the dense phase A' of the regenerator 35 through line 51. While passing downwardly through standpipe 49, the catalyst may be stripped of regeneration gases by the introduction through lines 52 of a suitable fluid stripping medium, such as steam. It is convenient to provide a fresh catalyst charging line 42a by means of which fresh catalyst may be introduced into the system. Ordinarily, a few tons will be blown into the cooled catalyst hopper 42 once every 24 hours. It is also convenient to provide a catalyst draw off line 42b by means of which contaminated catalyst can occasionally be withdrawn from the system and transported to a waste dump.

The capacity of cooled catalyst hopper 42 is a matter to be engineered for each particular system. However, this capacity must be sufficiently large to allow for varying the inventory of cooled catalyst stored in hopper 42 over whatever range of quantities may be required to employ the various methods of cooling regenerator 33.

As will be described hereinafter in connection with Table V, it is the preferred method of operation for the method of the present invention that cooler 39 be the only cooler employed in the system and that the quantity of catalyst cooled be regulated by controlling the level of the interface 35. When this preferred method is employed for cooling the regenerator, temperature control may be made automatic by control means 50a which operates valve 50 so as to maintain interface 35 at a predetermined height. Control means 50a includes a valve positioner, indicated as "VP" and two pressure differential controllers, indicated as "PDC," all in accordance with instrumentation well known in the art for controlling a valve in response to interface position.

In accordance with one method of operation, the catalyst recovered in the separator and returned to the dense phase of the regenerator through line 51 comprises only the entrained particles which have failed to be disengaged from the vapors in zone B' and which have been carried overhead through outlet line 36. The amount of cooled catalyst thus recycled to the dense phase of the regeneration zone is not sufficient to effect any substantial cooling of the catalyst bed as a whole in zone A'. Pursuant to this method the principal means for maintaining temperatures within the desired range in the regenerator 33, therefore, is by the use of cooler 31, which cools any desired proportion of the spent catalyst from the reactor 12 before its introduction to the regeneration zone.

Another method of operation involves the precooling of both the incoming spent catalyst stream directed through line 32 to the regenerator 33 and a stream of recycled regenerated catalyst withdrawn from the zone B' of the regenerator 33 through line 36 and returned to the zone A' of the regenerator through line 51, as illustrated in Fig. 1. In the practice of such modification the stream of regenerated catalyst withdrawn overhead from zone B' is suitably cooled in the heat exchanger 39 to a temperature sufficiently low to cause the recycled stream of regenerated catalyst to exert a substantial measure of temperature control upon the dense bed of catalyst when it is returned to the lower portion of A' through line 51. Table III which follows, illustrates the practice of the invention as so modified, as applied to a regeneration stage corresponding to a conversion stage in accordance with the conditions given in Table I.

It is apparent that the major portion of temperature control within the regenerator 33 is placed upon the heat exchanger 31 connected in the spent catalyst inlet line leading from the reactor 12 to the regenerator, since the amount of catalyst normally passing out of the regenerator through overhead line 36 is relatively small in comparison with the amount of spent catalyst being charged to the regenerator. To exert any substantial temperature control upon the dense phase bed in zone A', therefore, the recycled stream of regenerated catalyst must necessarily be subjected to considerable cooling. In the illustrative sample set forth in Table III it will be noted that the feed rate of cooled spent catalyst through line 32 to the dense bed of the regenerator is more than five times greater than the feed rate of cooled regenerated catalyst recycled to the dense bed of the regenerator through line 51.

*Table III*

Regenerator dimensions:
    Zone A'—
        Height _____ft__ 7
        Diameter _____ft__ 30.5
    Zone B'—
        Height _____ft__ 16
        Diameter _____ft__ 30.5
Spent catalyst (lines 17 and 18) _____lbs./hr__ 1,617,355
Cooled spent catalyst (line 32) _____lbs./hr__ 1,294,420
Spent catalyst (line 28) ____lbs./hr__ 322,935
Regenerated catalyst (line 51) _____lbs./hr__ 242,000
Temperature cooled spent catalyst (line 32) _____°F__ 870 to 785
Temperature spent catalyst (line 28) _____°F__ 940 to 985
Temperature regenerated catalyst (line 51) _____°F__ 600
Temperature regeneration zone __°F__ 1050
Catalyst concentration (average)—
    (a) Zone A' _____lbs./cu. ft__ 14.8
    (b) Zone B' _____lbs./cu. ft__ 1.0 to 1.5
    (c) Catalyst draw-off line 37 _____lbs./cu. ft__ 18
    (d) Flue gas outlet line 36 _____grains/cu. ft__ 400
Gas velocities—
    Zone A' _____ft./sec__ 1.62
    Zone B' _____ft./sec__ 1.85
Catalyst contact time (average) _____seconds__ 120

Regenerator pressures (gauge):
(a) Inlet to zone A' __lbs./sq. in__ 5.4
(b) Outlet from zone B' _____lbs./sq. in__ 3.9

Fig. 3 illustrates a modification in which the operation differs from that described in connection with Fig. 1 and illustrated by Table II in that a substantial proportion of regenerated catalyst may be withdrawn from the dense phase of the regenerator and recirculated to the regeneration zone with intervening cooling of the recycled stream. The elements of Fig. 3 which are similar in their function to those described in connection with Fig. 1 are indicated by similar reference numerals increased by the numeral 100, and hence further detailed description of these elements is believed unnecessary. In this embodiment, all the spent catalyst may be forwarded to the regeneration stage in a single stream through line 128, without any substantial or positive cooling of this stream below the temperature at which it is withdrawn from the conversion zone A. Regenerated catalyst for recycling is withdrawn directly from the dense phase through a withdrawal passageway or compartment 153, similar to passage 137. If desired, however, this compartment may be combined with compartment 137, and two catalyst outlet lines leading therefrom be employed, similar to standpipes 17 and 18. An aerating medium, such as air or steam, is supplied to compartment 153 through line 154 in amount sufficient to maintain the catalyst therein in a dense but flowable condition. From compartment 153, regenerated catalyst is withdrawn through standpipe 155 at a rate regulated by valve 156, and introduced to transfer line 157 through which it is conveyed by air to a heat exchanger 158 wherein it is cooled to a relatively low temperature, preferably below the ignition temperature of the carbonaceous material, by a suitable cooling medium circulated through lines 159.

Instead of utilizing the circuit comprising elements 153, 155, 156, 157 and 158 for the entire burden of temperature control duty, the dense phase stream of cooled catalyst may be supplemented by the catalyst carried overhead with the flue gases through line 136 and returned to the dense phase, after suitable cooling and separation from the flue gases, through line 151. Table IV sets forth suitable operating conditions in the application of this modification, described with reference to Fig. 3, to a regeneration operation corresponding to the conversion operation outlined in Table I, except that a lower catalyst to oil ratio of 4 to 1 has been employed.

Table IV

Regenerator dimensions:
Zone A'—
  Height _____ft__ 27.5
  Diameter _____ft__ 23
Zone B'—
  Height _____ft__ 14
  Diameter _____ft__ 27
Spent catalyst (line 128) ____lbs./hr__ 623,490
Temp. spent catalyst (line 128) ___°F__ 895
Recycled catalyst (line 157) __lbs./hr__ 637,000
Temp. recycled catalyst (outlet of 158) _____°F__ 595
Recycled catalyst (line 151) __lbs./hr__ 25,000
Temp. recycled catalyst (line 151) _°F__ 595
Temperature of regeneration zone _°F__ 1000
Catalyst concentration (average)—
  (a) Zone A' _____lbs./cu. ft__ 14.8
  (b) Zone B' _____lbs./cu. ft__ 1.0 to 1.5
  (c) Catalyst draw-off line 137 _____ _____lbs./cu. ft__ 18
Gas velocities—
  Zone A' _____ft./sec__ 1.8
  Zone B' _____ft./sec__ 1.7
Catalyst contact time (average) _____seconds__ 416
Regenerator pressures (gauge)—
  (a) Inlet to zone A' __lbs./sq. in__ 7.0
  (b) Outlet from zone B' _____lbs./sq. in__ 3.0

In the different illustrative embodiments of the invention described with reference to Figs. 1 and 2, in each instance the upward velocity of the oxygen-containing gas through the regeneration zone is maintained sufficiently low to cause a relatively dense and concentrated catalyst phase to form in the regeneration zone, and sufficiently high to produce a high degree of turbulence of the catalytic particles comprised in the dense phase with the consequent maintenance of a substantially uniform temperature therein. In addition, the catalyst is introduced to said dense phase after precooling to a temperature substantially lower than the substantially uniform temperature maintained in the regeneration zone. The precooled stream of catalyst entering the regenerator may suitably be cooled to a temperature below the ignition temperature of the carbonaceous deposit thereon without resulting in a subcooling of the regeneration zone to a point at which combustion would either cease or proceed at an unsatisfactorily low rate.

The range of upward gas velocities through the regeneration zone adapted to produce the required highly turbulent dense catalyst phase in this zone is dependent upon such physical characteristics as the particle size and density of the catalyst particles employed and may readily be determined experimentally for any particular choice of catalyst or contact agent. In the case of a powdered or finely divided cracking catalyst, such as the activated clay "Super-Filtrol" consisting largely of particles of mixed sizes smaller than 100 microns, the preferred range resides within 0.5 to 6.0 ft./second and preferably within the more restricted range of 1.0 to 3.0 ft./second.

A general advantage flowing through the practice of the invention is the reduction in quantity of catalyst circulated through the heat exchanger in order to accomplish the desired temperature control. A further highly important advantage is the reduction in the quantity of catalyst cooled and recycled to the regeneration zone with consequent important savings with respect to cost of circulating this catalyst and reduction in the size and cost of the equipment including the cooler and auxiliary lines.

In the various modifications illustrated by Figs. 1 and 3, in which the entrained catalyst carried overhead from the regeneration zone with the gaseous products of regeneration is cooled and subsequently returned to the regeneration zone, the maintenance of temperature control in the regenerator within the desired range is accomplished by the employment of two separate cooling systems. In Fig. 1 for example, coolers 31 and 39 are provided for the spent catalyst stream entering the regenerator and the overhead gas and catalyst stream leaving the regenerator, respectively. In Fig. 3, the cooler for the incoming spent catalyst stream is omitted, but a cooler 158 is provided for recycling a stream of catalyst withdrawn from the dense phase of the regenerator.

In accordance with the present invention, it is proposed to effect economies in construction and operation by eliminating one of the coolers and placing the burden of temperature control upon a single cooler. Pursuant thereto a stream of catalyst is withdrawn from the regeneration zone for passage concurrently with the gaseous products of regeneration through a common cooler, such as the cooler 39 of Fig. 1, and, after separating the catalyst from the gases, the cooled catalyst is returned to the dense phase of the regeneration zone. In such modification the cooler 31 is omitted.

One method for passing additional catalyst from the regeneration zone to the cooler is to cause the gases leaving the zone B' to carry with them an amount of catalyst in excess of what would normally be entrained in the overhead gas stream, as indicated for example, in illustrative Tables II to IV. This may be accomplished either by increasing the gas velocity within the regeneration zone, or by decreasing the disengaging height of zone B' so that the mouth of the overhead line 36 is nearer to the dense phase catalyst level 35. In the latter case the proximity of the dense phase bed to the zone of increasing velocity adjacent the outlet causes increased quantities of catalyst to be entrained in the gas stream. As an alternate arrangement for passing combined streams of catalyst and gases through the single cooler, a stream of catalyst may be withdrawn directly from the dense phase of the regenerator and passed to the inlet of the cooler 39, being united with the stream of gases and entrained catalyst withdrawn overhead from the zone B' through line 36 and being passed in admixture therewith through the cooler. The dense phase catalyst stream may be withdrawn, for example, at a point in the catalyst standpipe 7 suitable to provide the pressure head necessary to raise the catalyst to the elevation of the cooler and introduce it into the stream passing through line 36. Applying this alternate arrangement to Fig. 3, the dense phase catalyst stream may be withdrawn from a standpipe such as standpipes 107 and 155.

Appended Table V sets forth suitable operating conditions in the application of this invention to a regeneration operation corresponding to the conversion operation outlined in Table I. Either of the systems illustrated in Figs. 1 and 3 may be employed with but slight modification. It may be assumed that the apparatus comprising line 27, cooler 31, and line 32 are eliminated from Fig. 1, or that lines 155 and 157 and cooler 158 are eliminated from Fig. 3.

Although Table V refers to an operation as applied to the apparatus of Fig. 3, it may be made to apply also to the apparatus of Fig. 1 by the proper substitution of equivalent elements. By removing the hundreds digit from each numeral of the table, the latter may be considered in connection with Fig. 1.

It will be seen from the foregoing description that the method of the present invention is comprised broadly of the steps: maintaining interface 35 at an elevation at which dilute phase withdrawn through line 36 contains the quantity of catalyst required for cooling dense phase 33; cooling the dilute phase mixture to a predetermined cooled catalyst temperature; separating cooled catalyst from the dilute phase mixture and accumulating it in a cooled catalyst hopper 42 and recirculating cooled catalyst from the cooled catalyst hopper 42 through valve 50 to dense phase 33 at a rate which maintains interface 35 and hints the temperature of dense phase 33 at the required values.

It is a preferred species of this method of operation that valve 50 be operated automatically to maintain interface 35 at a predetermined level.

It is still another preferred species of the invention to accomplish all of the cooling of dense phase 33 by means of cooler 39. However, it is obvious that the method of the present invention also applies when some of the cooling for dense phase 33 is accomplished in some other way than by heat exchange in cooler 39. For example, a substantially constant quantity of heat may be abstracted from the system by means of 31, while cooler 39 is employed in accordance with the present method to vary the degree of additional cooling required.

While the preferred method of operation in accordance with the present invention contemplates the use of the single cooler 39, or 139, for effecting the desired temperature control within the regenerator, it is to be understood that this method of cooling the catalyst may be employed in conjunction with spent catalyst cooling, as by cooler 31 of Fig. 1 and with cooling of a recycle stream of dense phase catalyst from the regenerator, as by cooler 158 of Fig. 3.

*Table V*

Regenerator dimensions:
    Zone A'—
        Height _____ft__ 27.5
        Diameter _____ft__ 23
    Zone B'—
        Height _____ft__ 14
        Diameter _____ft__ 27
Spent catalyst (line 128) _____lbs./hr__ 623,490
Temp. spent catalyst (line 128) ____°F__ 895
Recycled catalyst (line 151) ____lbs./hr__ 662,000
Temp. recycled catalyst (line 151) __°F__ 595
Temp. of regeneration zone_____°F__ 1000
Catalyst concentration (average):
    (a) Zone A' _____lbs./cu.ft__ 14.8
    (b) Zone B' _____lbs./cu.ft__ 1.0–1.7
    (c) Catalyst draw-off line 137
        _____lbs./c.ft__ 18
    (d) Catalyst in flue gas line 136
        _____lbs./cu.ft__ .01–0.2
Gas velocities—
    Zone A' _____ft./sec__ 1.8
    Zone B' _____ft./sec__ 1.7
Catalyst contact time (average)
    _____ seconds__ 416
Regenerator pressures (gauge)—
    (a) Inlet to zone A'____lbs./sq. in__ 7.0
    (b) Outlet from zone B'_lbs./sq.in__ 3.0

We claim:

1. In a continuous process for the catalytic conversion of hydrocarbons wherein solid particles of a catalytic material and vapors of the hydrocarbons undergoing conversion are contacted in a conversion zone and the spent catalyst particles are separated from the vaporous conversion products and regenerated for use in said conversion zone by contacting them with an oxygen-containing gas in a regeneration zone, which method includes passing said oxygen-containing gas upwardly through a mass of said catalyst in said regeneration zone at such a velocity that the solids in said zone are maintained in a fluidized state and an interface is maintained between a lower dense phase and an upper light phase, the improvement which includes the steps of: withdrawing a stream of dense phase regenerated catalytic material from said regeneration zone and transferring it to said conversion zone; withdrawing dilute phase from said regeneration zone and cooling it; separating catalyst from said cooled dilute phase and accumulating a mass of cooled catalyst; and recirculating cooled catalyst from said mass of cooled catalyst to said dense phase at a rate sufficient to maintain said interface at a level at which said withdrawn dilute phase contains the quantity of catalyst required to be circulated for cooling.

2. A method as described in claim 1 in which the rate of recirculation of cooled catalyst from said mass of cooled catalyst to said dense phase is automatically increased or decreased as the interface falls or rises respectively.

3. A method as described in claim 1 in which the rate of recirculation of cooled catalyst from said mass of cooled catalyst to said dense phase is automatically increased or decreased as the temperature of said dense phase increases or decreases respectively.

4. A method as described in claim 1 in which said withdrawn dilute phase is cooled to a temperature substantially lower than the temperature of said dense phase in said regeneration zone.

5. A method as described in claim 1 in which said withdrawn dilute phase is cooled to a temperature not substantially greater than 650° F.

JOSEPH W. MOORMAN.
LOUIS J. KELLY.

REFERENCES CITED

The following references are of record in the file of this patent:

UNITED STATES PATENTS

| Number | Name | Date |
|---|---|---|
| 2,378,542 | Edmister | June 19, 1945 |
| 2,416,729 | Arveson | Mar. 4, 1947 |
| 2,420,049 | Martin | May 6, 1947 |
| 2,436,622 | Tyson | Feb. 24, 1948 |